US010552860B2

(12) United States Patent
Logsdon (10) Patent No.: US 10,552,860 B2
(45) Date of Patent: Feb. 4, 2020

(54) SYSTEMS AND METHODS FOR DISCOUNTING THE PRICE OF GOODS AND SERVICES TO A CONSUMER BASED ON PURCHASES MADE BY THE CONSUMER AT A PLURALITY OF MERCHANTS USING A PLURALITY OF FINANCIAL CARDS

(71) Applicant: Excentus Corporation, Dallas, TX (US)

(72) Inventor: Brandon Logsdon, Dallas, TX (US)

(73) Assignee: Excentus Corporation, Dallas, TX (US)

(*) Notice: Subject to any disclaimer, the term of this patent is extended or adjusted under 35 U.S.C. 154(b) by 1021 days.

(21) Appl. No.: 14/611,038

(22) Filed: Jan. 30, 2015

(65) Prior Publication Data

US 2016/0225007 A1     Aug. 4, 2016

(51) Int. Cl.
*G06Q 30/02* (2012.01)
(52) U.S. Cl.
CPC ..... *G06Q 30/0233* (2013.01); *G06Q 30/0215* (2013.01)
(58) Field of Classification Search
CPC .................................... G06Q 30/0233
USPC ....................................... 705/14.17
See application file for complete search history.

(56) References Cited

U.S. PATENT DOCUMENTS

| | | | |
|---|---|---|---|
| 6,594,640 B1 | 7/2003 | Postrel | |
| 6,820,061 B2 | 11/2004 | Postrel | |
| 7,620,567 B2 | 11/2009 | George et al. | |
| 7,653,571 B2 | 1/2010 | Jacoves et al. | |
| 7,742,942 B2 | 6/2010 | Nicholson | |
| 7,742,943 B2 | 6/2010 | Postrel | |
| 7,753,264 B2 | 7/2010 | Shafer et al. | |
| 7,765,124 B2 | 7/2010 | Postrel | |
| 7,769,630 B2 | 8/2010 | Postrel | |
| 7,933,841 B2 | 4/2011 | Schmeyer et al. | |
| 8,065,183 B1 | 11/2011 | Thompson | |
| 8,156,000 B1 | 4/2012 | Thompson | |

(Continued)

OTHER PUBLICATIONS http://blogs.microsoft.com/firehouse/2014/07/21/register-your-credit-and-debit-cards-to-save-with-Bing-Offers' new Card-Linked discount, last accessed Jul. 21, 2014, 4 pages.

(Continued)

*Primary Examiner* — Daniel M Sorkowitz
(74) *Attorney, Agent, or Firm* — Norton Rose Fulbright US LLP (57) ABSTRACT

The present disclosure is related to discounting a price of commodities to a consumer based on purchases made by the consumer with a financial card. A consumer registers with a reward program by providing information associated with a financial card to a reward program provider. The reward program provider may validate the financial card with a financial card provider (e.g., a card association), and, in response to a successful validation of the financial card, may receive, from the financial card provider, a token that may be used to identify purchases made by the consumer using the financial card, and the reward program provider may delete the financial information provided by the consumer during the registration process. The reward program provider may receive information that includes the token and indicates purchases made by the consumer and is used to determine rewards earned by the consumer.

25 Claims, 2 Drawing Sheets

(56) References Cited

U.S. PATENT DOCUMENTS

| | | |
|---|---|---|
| 8,412,624 B2 | 4/2013 | Scherpa et al. |
| 8,589,226 B1 | 11/2013 | Thompson |
| 8,608,061 B2 | 12/2013 | Krajicek et al. |
| 8,620,738 B2 | 12/2013 | Fordyce, III et al. |
| 8,626,577 B2 | 1/2014 | Redford et al. |
| 8,688,511 B2 | 4/2014 | Beal |
| 8,701,989 B2 | 4/2014 | Lehman |
| 8,719,087 B2 | 5/2014 | Beal |
| 8,732,005 B2 | 5/2014 | Schmeyer |
| 8,738,429 B2 | 5/2014 | Shepard |
| 8,783,561 B2 | 7/2014 | Wesley |
| 8,799,065 B2 | 8/2014 | Reuthe et al. |
| 2005/0197904 A1 | 9/2005 | Baron et al. |
| 2005/0240477 A1 | 10/2005 | Friday et al. |
| 2005/0261916 A1 | 11/2005 | McCall et al. |
| 2005/0267800 A1 | 12/2005 | Tietzen et al. |
| 2006/0085252 A1 | 4/2006 | Kersenbrock |
| 2006/0095318 A1 | 5/2006 | Ross et al. |
| 2006/0095328 A1 | 5/2006 | Ross et al. |
| 2006/0208065 A1 | 9/2006 | Mendelovich et al. |
| 2006/0253320 A1 | 11/2006 | Heywood |
| 2006/0293953 A1 | 12/2006 | Nicholson |
| 2007/0005416 A1 | 1/2007 | Jackson et al. |
| 2007/0038515 A1 | 2/2007 | Postrel |
| 2008/0021772 A1 | 1/2008 | Aloni et al. |
| 2008/0189183 A1 | 8/2008 | Nicholson |
| 2008/0255940 A1 | 10/2008 | Perreault et al. |
| 2009/0018916 A1 | 1/2009 | Seven et al. |
| 2009/0216646 A1 | 8/2009 | Seven et al. |
| 2009/0248506 A1 | 10/2009 | Goldstein et al. |
| 2010/0017284 A1 | 1/2010 | Ross et al. |
| 2010/0063874 A1 | 3/2010 | Keithley et al. |
| 2010/0088176 A1 | 4/2010 | Jacoves et al. |
| 2010/0191594 A1 | 7/2010 | White et al. |
| 2011/0010238 A1 | 1/2011 | Postrel |
| 2011/0060629 A1 | 3/2011 | Yoder et al. |
| 2011/0082737 A1 | 4/2011 | Crowe et al. |
| 2011/0202395 A1 | 8/2011 | Swan, Jr. et al. |
| 2011/0208576 A1 | 8/2011 | Durgin et al. |
| 2011/0225033 A1 | 9/2011 | Schmeyer et al. |
| 2011/0238471 A1 | 9/2011 | Trzcinski |
| 2012/0078695 A1 | 3/2012 | Paterson |
| 2012/0153030 A1 | 6/2012 | Hoppe |
| 2012/0209679 A1 | 8/2012 | Casares et al. |
| 2012/0239475 A1 | 9/2012 | Burgess et al. |
| 2012/0253914 A1 | 10/2012 | Black |
| 2013/0041727 A1 | 2/2013 | Baker |
| 2013/0159078 A1 | 6/2013 | Peck et al. |
| 2013/0179241 A1 | 7/2013 | Liu |
| 2013/0218658 A1 | 8/2013 | Crowe et al. |
| 2013/0238408 A1 | 9/2013 | Cooke et al. |
| 2013/0282468 A1 | 10/2013 | Michael |
| 2014/0095288 A1 | 4/2014 | Redford et al. |
| 2014/0172525 A1 | 6/2014 | Hammock et al. |
| 2014/0214509 A1 | 7/2014 | Lee et al. |
| 2014/0222540 A1 | 8/2014 | Shepard |
| 2014/0244371 A1 | 8/2014 | Postrel |
| 2014/0278894 A1 | 9/2014 | Toumayan et al. |
| 2014/0365289 A1 | 12/2014 | Perreault et al. |
| 2014/0372190 A1 | 12/2014 | Reuthe et al. |
| 2015/0012347 A1 | 1/2015 | Nicholson |
| 2015/0332306 A1* | 11/2015 | Marks ............... G06Q 30/0234 705/14.34 |

OTHER PUBLICATIONS http://www.digitaljournal.com/pr/2100510, last accessed Oct. 9, 2014, 3 pages.

http://online.wsj.com/article/PR-CO-20131007-904127.html, last accessed Oct. 9, 2014, 4 pages.

\* cited by examiner

SYSTEMS AND METHODS FOR DISCOUNTING THE PRICE OF GOODS AND SERVICES TO A CONSUMER BASED ON PURCHASES MADE BY THE CONSUMER AT A PLURALITY OF MERCHANTS USING A PLURALITY OF FINANCIAL CARDS

TECHNICAL FIELD

The present disclosure is generally related to providing discounts to consumers, and more particularly, to discounting the price of goods and services to a consumer based on purchases made by the consumer at a plurality of merchants using a plurality of financial cards.

BACKGROUND OF THE INVENTION

As the number of merchants offering goods and/or services increases, the number of available sources for those goods and/or services also increases, which may reduce the likelihood that a consumer repeatedly visits the same merchant each time that the consumer desires to purchase such goods and/or services. Rewards programs have been introduced and have been implemented in a variety ways, each designed to increase the likelihood that the consumer selects a particular merchant for particular goods and/or services.

One type of reward program that has been widely used is a single merchant reward program, whereby a single merchant offers consumers rewards for repeatedly visiting the merchant to purchase goods and/or services. Such reward programs suffer from several disadvantages. For example, the merchant is responsible for implementation of the reward program, maintaining reward program information, such as information identifying members of the reward program, reward balances, etc., and monitoring consumer transactions to determine whether rewards have been earned by the members of the rewards program. This increases the operating costs for the merchant, both in terms of technological investment to build the infrastructure for providing, maintaining, and operating the reward program, and in terms of additional employees (or time spent by employees) responsible for administering the reward program. Some third parties offer services whereby a merchant pays the third party to administer the reward program and maintain the reward program information. However, using third party rewards program providers requires the merchant to coordinate how rewards are earned, redeemed, etc. with the third party, and also increase the operating cost of the merchant (e.g., for building the infrastructure to integrate with the third party reward program platforms). Further, many single merchant reward programs only offer rewards that may be redeemed at the merchant, thereby limiting the types of goods and/or services for which earned rewards may be utilized. Additionally, many such programs are offered in connection with a reward program card, which may be a financial card (e.g., a credit card, a debit card, etc.) or may be a non-financial card used to indicate that the consumer is a member of the reward program. Thus, if the consumer does not have the reward program card when making a purchase, the consumer may not receive the reward.

Another type of reward program that has been used allows consumers to earn rewards for purchases made at a plurality of merchants, such as restaurants, whereby a consumer may earn rewards for purchases made at the plurality of merchants. In such a program, the consumer may first register one or more financial cards with a reward program provider (e.g., a third party that administers the reward program), and the reward program provider stores information associated with the registered one or more cards for the consumer. To determine whether the consumer has earned a reward, the reward program provider receives periodic (e.g., daily) reports from payment processors and payment processor aggregators (e.g., service providers that provide point of sale services to the merchants and act as an intermediary between the merchant and a financial card provider, such as a financial card issuer or a card association). In some instances, the periodic reports may include information associated with consumers that are not members of the reward program, thus, increasing the computational burden on the reward program provider who must filter the reports to identify whether particular transactions identified in the report correspond to purchases by consumers that are members of the reward program. This may increase the cost of administering the reward program, and therefore, may increase the cost to merchants that are participating in the reward program. Additionally, in some instances, the report may include financial information associated with the purchases, such as credit card numbers, names, etc., which may increase the likelihood that the reward program provider and/or the payment processors and payment processor aggregators are targeted by entities seeking to obtain the financial information. Further, because the reports are provided from the payment processors and payment processor aggregators periodically, such reward programs cannot support real-time updates of earned rewards.

BRIEF SUMMARY OF THE INVENTION

The present disclosure provides for systems, methods, apparatuses, and computer-readable storage media for discounting a price of goods and services to a consumer based on purchases made by the consumer at a plurality of merchants using a plurality of financial cards. In an embodiment, a consumer registers as a member of a reward program provided by a reward program provider. During the registration, the consumer may provide information associated with one or more financial cards to the reward program provider, where the consumer earns rewards for purchases made at a plurality merchants (e.g., merchants that participate in the reward program) using the one or more financial cards. In response to receiving the financial card information, the reward program provider may validate the one or more financial cards with one or more financial card providers (e.g., banks that issue the one or more financial cards to the consumers and/or card associations or card networks, such as Visa, MasterCard, American Express, etc.).

In an embodiment, in response to a successful validation of the one or more financial cards, the reward program provider may exchange, with each of the one or more financial card providers, a token that may be used to identify the purchases made by the consumer using a particular financial card of the one or more financial cards. In an additional or alternative embodiment, the reward program provider may generate the tokens in response to successful validation of the one or more financial cards, and may provide the tokens to the respective financial card providers for subsequent use to identify the purchases made by the consumer using a particular financial card of the one or more financial cards. In yet another additional or alternative embodiment, some of the financial card providers may generate tokens associated with some of the one or more financial cards, while the reward program provider may generate tokens for other financial card providers associated with other financial cards. The tokens may be used to identify consumers and their associated financial cards during communications between the financial card providers and the reward program provider. Using the tokens, rather than the consumer's information or financial card information, during the communications may reduce the likelihood that the reward program provider is targeted by identity thieves and other entities seeking to intercept financial information from the communications.

In an embodiment, when the consumer makes a purchase using a financial card, the financial card provider may transmit a notification to the reward program provider, where the notification indicates a preliminary amount of the purchase and includes the token associated with the financial card. Because the notification is received from the financial card provider directly, as opposed to being received from a payment processor or payment processor aggregator, the notification may be provided in real-time or near real-time, which may allow the exemplary systems, methods, apparatuses, and computer-readable storage media to identify pending earned rewards as transactions occur. When a pending financial card transaction is settled out, the reward program provider may receive an additional notification from the financial card provider that includes a final transaction amount, and the reward program provider may then update the amount of the earned reward, and credit the earned reward to a rewards balance associated with the consumer. Rewards earned through the rewards program may be used to provide the consumer with discounts on a plurality of commodities (e.g., fuel discounts, utility and energy bill discounts, cell phone bill/minutes/data discounts, air travel, cash back, goods, services, etc.) provided by a plurality of rewards providers participating in the rewards program.

In an embodiment, the reward program provider may target information to consumers that are registered in the rewards program via one or more mediums (e.g., social media, e-mail, text messages, web pages, a push notification, a prompt provided via a mobile application executing on a mobile device associated with the consumer, or a combination thereof). For example, a mobile application may be executing on a mobile device associated with the consumer and may provide location information to the reward program provider. The reward program provider may determine, based on the location information, whether the consumer is proximate one or more merchants participating in the rewards program (e.g., one or more merchants where rewards may be earned). In an embodiment, the mobile application may determine whether the consumer is proximate one or more merchants participating in the rewards program, rather than transmitting the location information to the reward program provider. In response to a determination (by the rewards program provider or the mobile application) that the consumer is proximate the one or more merchants, one or more offers associated with the one or more merchants may be identified and provided to the consumer (e.g., via a text message, an e-mail, the mobile application, etc.). Additionally, the rewards program provider may receive subsequent location updates from the mobile device associated with the consumer (or may be determined by the mobile application), and may send or present personalized messages to the mobile device. In response to a determination that the consumer is in proximity to or visiting one of the one or more merchants, the rewards program provider may provide reward program information to the consumer, where the reward program information may indicate a purchase amount required to earn an additional reward under the reward program (e.g., a threshold amount that the consumer needs to spend to qualify for additional rewards), and/or may indicate an amount of awards available to be redeemed at the merchant. Other information may also be targeted to the consumer by the reward program provider.

In an embodiment, the reward program provider may determine a frequency at which consumers participating in the reward program make purchases at each of a plurality of merchants, where a frequency at which the consumers make purchases at a particular merchant is determined based on purchase information associated with purchases made at the first merchant by the consumers using financial cards provided by a plurality of financial card providers. Thus, the consumers participating in the rewards program may earn rewards for purchases at any participating merchant irrespective of the financial card used to provide payment for the purchases so long as the financial card used has been registered and validated with the reward program provider. The purchase information may be received by the reward program provider from the plurality of financial card providers. Additionally, the reward program provider may generate a plurality of reports, and each of the plurality of reports may be associated with one of the plurality of merchants. Each of the plurality of reports may indicate, for a respective merchant of the plurality of merchants, the frequency at which the consumers of the reward program make purchases at the respective merchant. The reward program provider may periodically provide the plurality of reports to the respective merchants.

In an embodiment, the rewards may be redeemed to reduce the price of a product and/or service. When a reward is redeemed at a particular merchant, the reward program provider may provide the payment of the redeemed reward amount to the particular merchant. The payment of redeemed rewards by the reward program provider may be funded by commissions earned by the rewards program provider, where the commissions are paid to the reward program provider by the plurality of participating merchants in exchange for the reward program provider administering the reward program (e.g., providing the targeted offers, maintaining reward account balances, paying rewards redemptions, signing up merchants to provide the products and/or services for which the rewards may be redeemed, etc.). Thus, there is no infrastructure costs or initial investments required for a merchant to participate in the rewards program. For example, the rewards are calculated using financial information received from the financial card providers, rather than the merchants having to track and provide purchase information to the reward program provider. Further, no special reward cards need to be distributed to consumers since the consumers' existing financial cards may be used to track and aggregate earned rewards.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
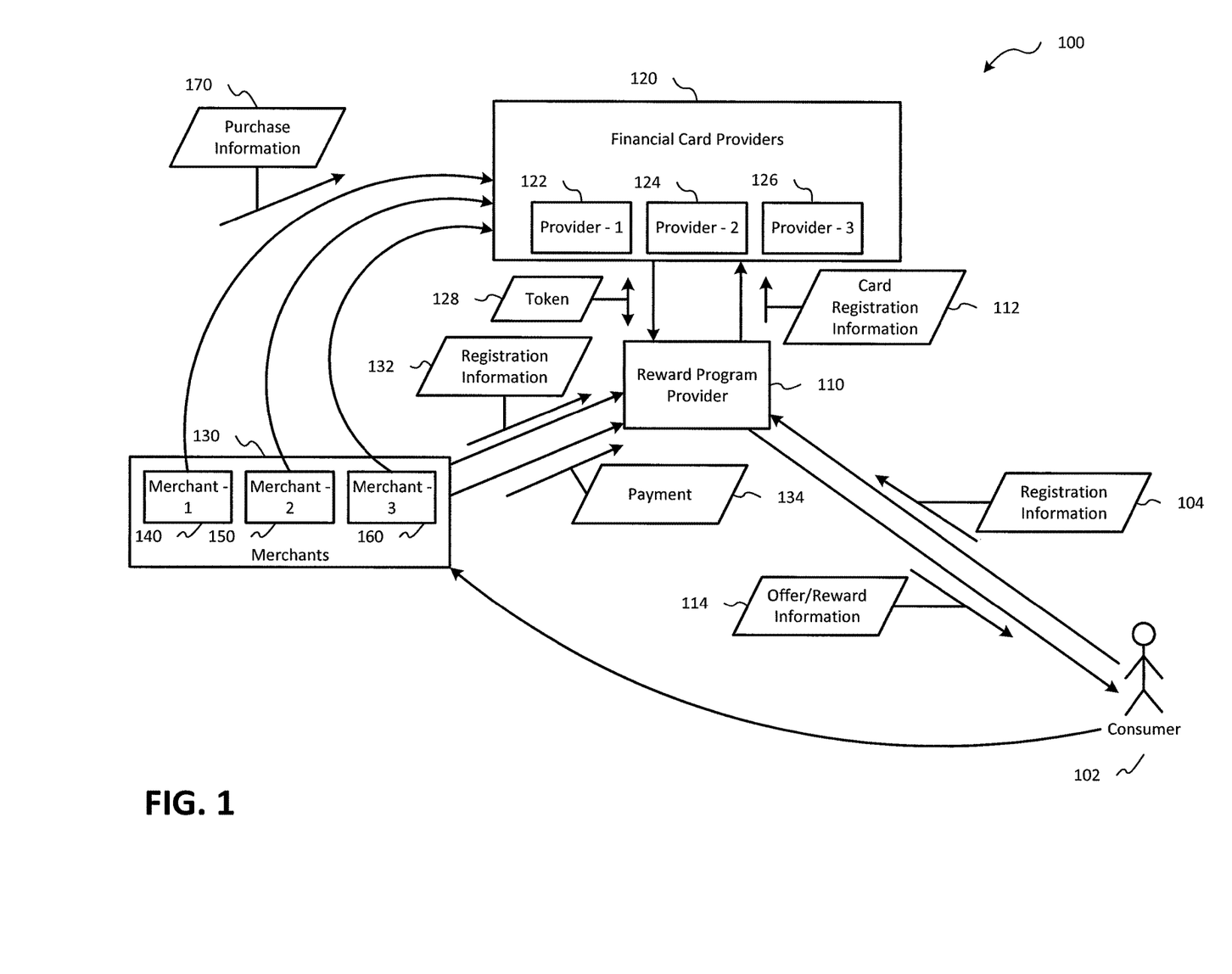
FIG. 1 is a block diagram illustrating an embodiment of a system for discounting a price of commodities to a consumer based on purchases made by the consumer with a plurality of financial cards.

Referring to FIG. 1, a block diagram illustrating an embodiment of a system for discounting a price of goods and services to a consumer based on purchases made by the consumer at a plurality of merchants using a plurality of financial cards is shown as a system 100. As shown in FIG. 1, the system 100 may include a reward program provider device 110, a plurality of financial card providers 120, and a plurality of merchants 130. In an embodiment, the plurality of financial card providers 120 may be entities that issue one or more types of financial cards (e.g., debit cards, credit cards, prepaid cards, gift cards, etc.) to consumers, such as a consumer 102. In an additional or alternative embodiment, the plurality of financial card providers 120 be card associations or networks (e.g., Visa, MasterCard, etc.). In yet another additional or alternative embodiment, the plurality of financial card providers 120 may include both the entities that issue one or more types of financial cards and the card associations.

As shown in FIG. 1, the plurality of financial card providers 120 may include a first financial card provider 122 (labeled "Provider-1" in FIG. 1), a second financial card provider 124 (labeled "Provider-2" in FIG. 1), and a third financial card provider 126 (labeled "Provider-3" in FIG. 1). In an embodiment, each of the financial card providers 122, 124, 126 may be a distinct entity that issues at least one of a debit card and a credit card to consumers, such as the consumer 102. In an additional or alternative embodiment, each of the financial card provider 122, 124, 126 may be entities that issue either debit cards or credit cards (but not both) to consumers, such as the consumer 102. For example, a financial card entity may have distinct business entities or subsidiaries for issuing credit cards and debit cards respectively. Thus, a financial card provider may be an entity offering both debit and credit cards to consumers, or may be an entity offering only debit cards or only credit cards to consumers. In yet another additional or alternative embodiment, each of the financial card providers 122, 124, 126 may be distinct entities operating one or more financial card networks. In some embodiments, the plurality of financial card providers 120 may also include entities that issue prepaid cards and maintain prepaid card balances (or gift cards and gift card balances, etc.), and such entities may or may not provide debit and/or credit cards to consumers. It is noted that although the plurality of financial card providers 120 is shown as including three financial card providers (e.g., the financial card providers 122, 124, 126), the system 100 may operate with more than three financial card providers or less than three financial card providers in some embodiments.

The plurality of merchants 130 may correspond to entities that sell goods and services to consumers, such as a consumer 102. As shown in FIG. 1, the plurality of merchants 140 may include a first merchant 140 (labeled "Merchant-1" in FIG. 1), a second merchant 150 (labeled "Merchant-2" in FIG. 1), and a third merchant 160 (labeled "Provider-3" in FIG. 1). It is noted that although the plurality of merchants 130 is shown as including three merchants (e.g., the merchants 140, 150, 160), the system 100 may operate with more than three merchants or less than three merchants in some embodiments.

In an embodiment, the reward program provider device 110 may be a laptop computing device, a server, a personal computing device, a tablet computing device, a mobile device (e.g., a smartphone, a mobile communication device, a personal digital assistance (PDA), etc.) configured for discounting a price of commodities to a consumer (e.g., the consumer 102) based on purchases made by the consumer with a plurality of financial cards (e.g., a plurality of financial cards associated with the plurality of financial card provides 120). In an embodiment, the reward program provider device 110 may include a processor and a memory (not shown in FIG. 1). The memory may include random access memory (RAM), read only memory (ROM), flash memory, disk memory, solid state drive (SSD) memory, optical memory, and/or the like, or combinations thereof, and may store instructions that, when executed by the processor, cause the processor to perform the operations described in connection with the reward program provider device 110 with reference to FIGS. 1-3.

The reward program provider device 110 may be operated by a reward program provider that offers one or more rewards programs that allow consumers to earn rewards for purchases made using financial cards issued by the plurality of financial card providers 120. To facilitate the reward program(s), the reward program provider may establish relationships with each of the plurality of financial card providers 120 and with each of the plurality of merchants 130. The relationship between the reward program provider and each of the plurality of financial card providers may be such that the reward program provider device 110 is in direct communication with systems operated by each of the plurality of financial card providers 120, as opposed to being in communication with payment processors and payment processor aggregators, as described in more detail below. Additionally, the relationship between the reward program provider and each of the plurality of merchants 103 may be such that each of the plurality of merchants 130 pays a commission to the reward program provider in exchange for the reward program provider providing the reward program, as described in more detail below. The reward program may be designed to encourage consumers, such as the consumer 102, to make purchases at the plurality of merchants 130, rather than at merchants that are not participating in the rewards program offered by the rewards program provider, as described in more detail below.

During operation, each of the plurality of merchants may provide merchant registration information 132 to the reward program provider device 110 to register as a participating merchant (e.g., a merchant that is participating in the rewards program and has agreed to pay the reward program provider a commission in exchange for the reward program provider's administration of the reward program). In an embodiment, the merchant registration information 132 may be provided as a signed contract executed between each of the plurality of merchants 130 and the reward program provider, such as during a meeting, and the merchant registration information 132 may subsequently be input to the reward program provider device 110 by the reward program provider. Although not shown in FIG. 1, in an additional or alternative embodiment, the merchant registration information 132 may be provided to the reward program provider device 110 via an electronic form provided to the reward program provider device 110 via a webpage, an e-mail, and the like. In an embodiment, as part of the merchant registration process, the rewards program provider device 110 may provide at least a portion of the merchant registration information 132 to the plurality of financial card providers 120. By notifying the plurality of financial card providers 120 of the participating merchants, the plurality of financial card providers 120 may be able to distinguish purchases by participating consumers at both participating and non-participating merchants. Thus, the plurality of financial card providers 120 may be able to only provide purchase notifications to the reward program provider device 110 for purchases made at participating merchants, rather than purchases at all merchants, which would require the rewards program provider device 110 to then filter the purchase notifications to identify the purchases corresponding to participating merchants.

Once a particular merchant has been registered with the rewards program, the reward program provider and/or the reward program provide device 110 may generate one or more offers that may be provided to consumers participating in the rewards program, as described in more detail below. In an embodiment, the rewards program provider may generate the offers independent of or in collaboration with each of the participating merchants. In an additional or alternative embodiment, the participating merchants may be provided with an interface (e.g., a web page or stand-alone application) that may be used to provide offer information (e.g., images, promotional pricing information, information regarding a time period for a particular offer, etc.) to the reward program provider device 110, and the offers may be generated based on the offer information received from each of the participating merchants. In an embodiment, the reward program provider device 110 may automatically generate the offers based on the offer information without requiring additional actions to be taken by the reward program provider. In still another additional or alternative embodiment, the reward program provider device 110 may automatically generate the offers based on information provided by the reward program provider, rather than based on information provided by the participating merchants. In yet another additional or alternative embodiment, the reward program provider device 110 may automatically generate the offers based on the offer information received from the participating merchants and/or based on information provided by the reward program provider.

The consumer 102 may register as a member of the reward program provided by the reward program provider. During the registration, the consumer 102 may provide consumer registration information 104 (e.g., the consumer's name, financial card numbers, address information, etc.) associated with one or more financial cards (e.g., one or more financial cards issued by one or more of the plurality of financial card providers 120) to the reward program provider device 110.

In response to receiving the registration information, the reward program provider device 110 may validate the one or more financial cards with particular ones of the plurality of financial card providers 120. For example, as shown in FIG. 1, the reward program provider device 110 may provide card registration information 112 to the each of the particular ones of the plurality of financial card providers 120 to validate each of the financial cards identified or included in the consumer registration information 104, where, for a particular financial card provider of the plurality of financial card providers 120, the card registration information 112 may be card information for a card associated with the particular financial card provider (e.g., when the financial card information 112 is associated with the first financial card provider 122, the financial information 112 may be provided to the first financial card provider 122). Upon receiving the card registration information 112, the particular ones of the plurality of financial card providers may verify that the financial card information (e.g., the credit card number, expiration date, etc.) are valid and associated the consumer 102's name and address.

In an embodiment, in response to a successful validation of the one or more financial cards and the reward program provider device 110 may exchange, with each of the particular ones of the plurality of financial card providers 120, a token 128 that may be used to identify the purchases made by the consumer using a particular financial card of the one or more financial cards. For example, the token 128 may include information that is distinct from and does not include the financial card information (i.e., the token 128 does not provide any indication of the identity of the consumer 102 and/or the financial card information provided to the reward program provider device 110). In an additional or alternative embodiment, in response to a successful validation of the one or more financial cards, the reward program provider device 110 may generate one or more tokens that may be provided to respective ones of the one or more financial card providers, and may be used to identify the purchases made by the consumer using a particular financial card of the one or more financial cards. In yet another additional or alternative embodiment, some of the plurality of financial card providers 120 may generate tokens, while the reward program provider device 110 may generate tokens for other financial card providers of the plurality of financial card providers. In an embodiment, the financial card information may be registered with other devices that are authorized to handle the financial card information, and additional tokens may be generated and exchanged between the reward program provider device 110 and the other devices in response to successful validation of the one or more financial cards.

In an embodiment, after exchanging the token 128, communications between the reward program provider device 110 and the financial card provider (or other third parties that exchanged tokens with the reward program provider device 110) may use the token to identify the consumer and the particular financial card used by the consumer to make a purchase. By using the token, rather than the financial card information, during communications, the likelihood that an unauthorized third party obtains the financial card information by intercepting the communications may be reduced. This may reduce the likelihood that the reward program provider, and more particularly, the reward program provider device 110, is targeted by identity thieves and other entities seeking to obtain financial information. The relationships between the reward program provider and each of the plurality of financial card providers 120 may require that the reward program provider and its systems (e.g., the reward program provider device 110) comply with various regulations, such as the Gramm-Leach-Bliley Act (GLBA), that impose restrictions on financial institutions (e.g., the plurality of financial card providers 120) regarding the types of safeguards that must be in place with respect to private financial information of consumers having relationships with the financial institutions (e.g., the ongoing relationship provided by the issuance of a financial card to a consumer), and notifications that must be provided to the consumers regarding information that the financial institution obtains about the consumers, whether and how that information may be shared by the financial institutions, and how that information is safeguarded. By not exchanging the financial information of the consumers during communications, the reward program provider may reduce a likelihood of non-compliance with the GLBA, and may further simplify management of compliance with the GLBA, which may increase the likelihood that the plurality of financial card providers 120 will allow the reward program provider device 110 to communicate directly with the systems of each of the respective financial card providers 122, 124, 126, as described in more detail below.

In an embodiment, in addition to receiving information identifying the consumer 102, and the one or more financial cards associated with the consumer 102, the registration information 104 may include one or more permissions. The one or more permissions may enable the consumer 102 to opt-in or opt-out for particular rewards (e.g., rewards for particular types of merchants, particular types of offers, etc.) and may also enable the consumer 102 to opt-in or opt-out of particular notifications (e.g., messages sent to the consumer 102 by the reward program provider device 110), such as targeted offers determined based on a current location of the consumer 102, and to designate one or more types of media (e.g., text messages, short message service (SMS) messages e-mails, web pages, social media, a push notification, a prompt provided via a mobile application executing on a mobile device associated with the consumer 102, or a combination thereof) that the reward program provider device may use to transmit the targeted offers to the consumer 102. The program provider device 110 may store information (e.g., a profile) associated with the consumer 102, and the information may include the permissions granted by the consumer 102 during the registration process. Further, the consumer 102 may subsequently add or remove financial cards to the rewards program by submitting additional registration information 104 (for adding a new financial card or removing a previously registered financial card). In an embodiment, the registration information may be provided to the reward program provider device 110 via a web page, a telephone call (e.g., to a call center operated by the reward program provider), or by using a mobile application provided by the reward program provider. Further, the information stored in association with the consumer 102 may include a mobile and/or other type of phone number associated with the consumer 102, and e-mail address associated with the consumer 102, an address associated with the consumer 102, or other information. In an embodiment, the information stored by the reward program provider device 110 may be stored in compliance with one or more standards, such as a payment card industry (PCI) data security standard (DSS) (e.g., PCI/DSS level 1, level 2, level 3, or level 4).

As a result of the registration, the consumer 102 may earn rewards for purchases made at a plurality of merchants (e.g., merchants that participate in the reward program) using the one or more financial cards. In an embodiment, when the consumer makes a purchase using a financial card that has been registered (e.g., a token has been received in connection with the financial card) with the reward program device 110, the financial card provider may transmit a notification (not shown in FIG. 1) to the reward program provider device 110. The notification may indicate a preliminary amount of the purchase and may include the token associated with the financial card. The notification may also include a date of the purchase. The token may be used by the reward program provider device 110 to identify the consumer 102 associated with the notification, and the identity of the consumer 102 may be subsequently used to update rewards information associated with the consumer 102, as described in more detail below. Because the notification is received from the financial card provider directly, as opposed to being received from a payment processor or payment processor aggregator, the notification may be provided in real-time or near real-time (e.g., within 1-10 milliseconds of swiping the financial card). This may allow the reward program provider device 110 to identify pending earned rewards and provide notifications to the consumer as transactions occur in real-time or near real-time (e.g., within 60 seconds or less of swiping the financial card).

When a pending financial card transaction is settled out, the reward program provider device 110 may receive an additional notification (not shown in FIG. 1) from the financial card provider, where the additional notification may include a final transaction amount. To illustrate, when the consumer 102 purchases goods, such as a television, groceries, fuel, etc., the pending amount and the final amount (e.g., the purchase amounts indicated in the notification and the additional notification, respectively) may be the same. However, when the consumer 102 dines at a restaurant, the consumer purchases goods (e.g., the meal) and services (e.g., the waiter's services). In such instances, it is common for the bill, when provided to the consumer 102, to be in the amount of the cost of the goods, and the consumer may add an additional amount to the payment for a tip (e.g., payment for the waiter's services). When such a payment is processed, it is initially processed in the amount of the goods, and when the purchase is settled out with the financial card provider, the final purchase price (e.g., the amount charged to the financial card) may reflect the amount of the goods and the payment for the services (e.g., the cost of the meal and the tip). Thus, the notification may indicate the purchase price for the goods only, or may indicate the price for the goods plus a standard/generic additional amount for payment services, while the additional notification may indicate the settled out purchase price that includes the purchase price of both the goods and the services. Thus, the reward program provider device 110 may receive the notification indicating a pending charge to the financial card, and may determine a pending earned reward amount or other reward information (e.g., a total amount of purchases required to earn a reward), and may send offer/reward information 114 to the consumer 102. When the additional notification is received, the reward program provider device 110 may update the amount of the earned reward, and finalize the reward (e.g., credit the earned reward to a rewards balance associated with the consumer). Additionally, if the settled amount is different from the amount indicated by the initial notification, the reward program provider device 110 may transmit updated offer/reward information 114 to the consumer 102 reflecting any difference in the offer/reward information caused by the difference between the pending and settled purchase amounts.

In an embodiment, the offer/reward information 114 may reflect an amount of rewards that may be redeemed at a particular merchant, as described in more detail below. In an additional or alternative embodiment, rewards may be earned for each time the consumer 102 makes purchases at the plurality of merchants 130 that, in the aggregate, exceed a threshold (e.g., ten cents in rewards currency for every "X" dollars spent, a "Y" price per unit discount on purchases of fuel for every "X" dollars spent/gallons purchased, etc.), and the offer/reward information 114 may indicate a number of dollars that the consumer 102 needs to spend to reach a next earned reward. For example, assuming that the consumer 102 earns rewards for every "X" dollars spent on purchases at the plurality of merchants 130, and assuming that the consumer 102 has spent "Y" dollars, where "Y"<"X," the offer/reward information 114 may indicate that if the consumer 102 spends "X"–"Y" more dollars at one of the plurality of merchants 130, the consumer 102 will earn a particular reward. By notifying the consumer 102 of an amount that the consumer 102 needs to spend to receive a next reward, the consumer 102 may be more likely to spend that amount at one of the participating merchants (e.g., at one of the plurality of merchants 130). Rewards earned through the rewards program may be used to provide the consumer with discounts on a plurality of commodities (e.g., fuel discounts, utility and energy bill discounts, cell phone bill/minutes/data discounts, air travel, cash back, goods, services, etc.) provided by a plurality of rewards providers participating in the rewards program. In an embodiment, the offers/rewards may be determined based on the permissions provided to the reward program provider device 110 during or subsequent to the registration process.

In an embodiment, the reward program provider device 110 may target information to consumers that are registered in the rewards program via one or more mediums (e.g., social media, e-mail, text messages, web pages, mobile applications, etc.). For example, a mobile application may be executing on a mobile device associated with the consumer, and may provide location information to the reward program provider device 110. The reward program provider device 110 may determine, based on the location information, whether the consumer 102 is proximate one or more merchants participating in the rewards program (e.g., one or more of the plurality of merchants 130 where rewards may be earned for purchases). In an embodiment, the reward program provider device 110 may store merchant location information (e.g., geo-fence information, address information, etc.) that may identify a location of each of the plurality of merchants 130, and may determine whether the consumer 102 is proximate to the one or more merchants based on the location information indicating the current location of the consumer 102 and the merchant location information. In response to a determination that the consumer is proximate to the one or more merchants, the rewards program provider device 110 may identify one or more offers associated with the one or more merchants and may provide the one or more offers to the consumer (e.g., via a text message, an e-mail, a mobile application, etc.). In an embodiment, the one or more offers may be determined based on the permissions provided by the consumer 102, as described above.

In an embodiment, the offer/reward information 114 may be tailored to the particular merchant at which that the consumer 102 most recently completed a purchase. For example, in response to a purchase at the second merchant 150, the reward program provider device 110 may generate and transmit the offer/reward information 114 to the consumer 102, where the offer/reward information 114 identifies the second merchant 150. For example, the offer/reward information 114 may include a message such as "Thank you for your recent purchase at Merchant A. You are $ X dollars closer to earning your next reward." Thus, although transmitted by the reward program provider device 110, the message appears to be from the second merchant 150, and expresses gratitude on the part of the second merchant 150 for the consumer 102's recent purchase, which may increase the likelihood that the consumer 102 makes additional purchases from the second merchant 150. In an embodiment, the offers that may be transmitted to the consumer 102 may include at least one offer selected from a list of offers consisting of: an offer for a discount on a product sold by the at least one merchant, an offer for a discount on a service provided by the at least one merchant, an offer to redeem at least a portion of the balance of the account of the consumer in connection with a purchase of a product, a service, or both from the at least one merchant, an offer for a commodity reward (e.g., a price per unit (PPU) discount on fuel sold by at least one merchant, a reduction of an electric bill, etc.), and a notification that one or more offers from the at least one merchant are about to expire. In an embodiment, the offers may be exclusive to consumers participating in the reward program. For example, the offers may be promotions offered by particular participating merchants that are only provided to participating consumers by the reward program provider device 110.

In an embodiment, in addition to sending offers to the consumer 102, the reward program provider device 110 (or a mobile application executing on a mobile device associated with the consumer 102), the reward program provider device 110 (or the mobile application) may transmit personalized messages to the consumer 102. For example, the personalized messages may include messages promoting merchants that the consumer 102 has not shopped at before such as "Try this merchant," or messages acknowledging the consumer 102's loyalty to a merchant, such as "Welcome back, and thank you for choosing us again."

In an embodiment, the rewards program provider device 110 may receive subsequent location updates from the mobile device associated with the consumer 102, and may determine whether the location of the consumer 102 indicates that the consumer is visiting one of or in proximity to the one or more merchants. In response to a determination that the consumer is visiting one of or in proximity to the one or more merchants, the rewards program provider device 110 may provide reward program information to the consumer 102. The reward program information may indicate a purchase amount required to earn an additional reward under the reward program (e.g., a threshold amount that the consumer 102 needs to spend to qualify for and earn additional rewards), and/or may indicate an amount of awards available to be redeemed at the merchant. Other information may also be targeted to the consumer by the reward program provider device 110, such as coupons, multimedia content, such as advertisements for goods and/or services sold by the merchant, etc. Further, because the notifications from the financial card providers are received in real-time or near real-time, as soon as the consumer 102 completes a purchase, the reward program provider device 110 may receive notification of the purchase, and may send a message to the consumer 102 indicating acknowledging that the purchase has been applied to the consumer's earned rewards, and/or indicate a remaining amount that the consumer 102 must spend to earn an additional reward. By indicating in real-time or near-real time (e.g., between 1-10 milliseconds of swiping the financial card at checkout) that the consumer 102 has earned a reward for a recently made purchase, or by indicating an additional amount that the consumer 102 must spend to earn additional rewards, the consumer 102 may be more likely to make additional purchases more quickly. For example, by indicating the amount of earned rewards and/or the amount that the consumer 102 needs to spend to earn an additional reward, the consumer 102 may be more likely to purchase goods and/or services at one of the plurality of merchants 130 that the consumer 102 did not originally intend to purchase (e.g., an impulse buy), thereby increasing the likelihood that the consumer 102 makes an additional purchase at one of the plurality of merchants 130 in the near future, as opposed to delaying such purchases until the consumer 102 receives a monthly statement associated with the consumer 102's earned rewards.

In an embodiment, the reward program provider device 110 may determine a frequency at which consumers participating in the reward program, such as the consumer 102, make purchases at each of the plurality of merchants 130. For example, for a first merchant (e.g., the first merchant 140) of the plurality of merchants 130, a frequency at which the consumer 102 makes purchases at the first merchant may be determined based on purchase information associated with purchases made at the first merchant by the consumer 102 using registered financial cards (e.g., financial cards for which tokens have been received). The purchase information may be received by the reward program provider device 110 directly from the plurality of financial card providers 120, as opposed to payment processors and/or payment processor aggregators. Additionally, the reward program provider device 110 may generate a plurality of reports, and each of the plurality of reports may be associated with one of the plurality of merchants 130. A report associated with a particular merchant may indicate the frequency at which the consumers of the reward program make purchases at the particular merchant. For example, the report may indicate the frequency at which all consumers in the reward program have made purchases at the particular merchant. Additionally, the report may include information indicating how often the participating consumers make purchase at the particular merchant, an average time in between purchases at the particular merchant, an average purchase amount for purchases made by the participating consumers at the particular merchant, and changes in the recentcy with respect to the particular merchant. For example, the report may indicate an average number of days following a purchase that the participating consumers return to the particular merchant to make an additional purchase.

In an embodiment, the report may also compare the frequency at which the participating consumers make purchases at the particular merchant relative to non-participating consumers (e.g., consumers that are not participating in the reward program provided by the reward program provider). In an embodiment, the comparison may be based on information generated from one or more surveys. For example, the reward program provider (or a third party) may periodically generate one or more surveys to generate information that indicates a total number of purchases made at particular merchants of the plurality of merchants 130 by participating and non-participating consumers, respectively. The survey information may indicate purchases made during a time period (e.g., a time period designated an amount of time between generating reports). For example, the report may indicate that participating consumers made "X" purchases at the first merchant 140 during the time period (e.g., a day, a week, a month, etc.), and that non-participating consumers made "Y" purchases at the first merchant 140 during the time period. The reward program provider device 110 may then use the survey data to determine the frequency at which the participating consumers make purchases at particular merchants relative to non-participating consumers. Such information may help establish that the reward program increases the frequency at which consumers make purchases at the plurality of merchants 130, thereby establishing that the reward program is increasing the sales incrementally over time for the plurality of merchants 130.

In an embodiment, in addition to survey information specific to participating merchants, the reward program provider device 110 may generate reports that indicate performance of participating merchants (e.g., merchants that participate in the rewards program) relative to non-participating merchants. For example, in an embodiment, the survey information may indicate the number of purchases made at non-participating merchants and participating merchants. In an embodiment, such reports may be based solely on purchases made by participating consumers. For example, the one or more surveys may be provided to only participating consumers, and may indicate that participating consumers made a first number of purchases at non-participating merchants, and made a second number of purchases at participating merchants. This may show that consumers are making more purchases at the participating merchants than the non-participating merchants, or vice-versa, and may be used to evaluate the performance of the reward program. In an embodiment, the report may identify the participating and non-participating merchants by category of merchant (e.g., grocers, gas stations, dry cleaners, home improvement stores, etc.). In an additional or alternative embodiment, the survey information may indicate purchases made by both non-participating and participating consumers at the participating and non-participating merchants. In an embodiment, the survey information may further indicate an average purchase amount for the participating and non-participating consumers at each of the merchants. This information may be used by the reward program provider device 110 to generate a report indicating whether participating consumers spend more dollars per purchase on average than non-participating consumers. It is noted that, in addition to obtaining the information described above from surveys, in an embodiment, that information may be provided to the reward network provider device 110 by the plurality of financial card providers 120. For example, the plurality of financial card providers 120 may be able to identify the participating merchants (through the merchants registration information 132 provided to the plurality of financial card providers by the reward program provider device 110), and may provide reports to the reward program provider device 110 that include information similar to the survey information described above. In yet another additional or alternative embodiment, both survey information and information obtained or received from the plurality of financial card providers may be used by the reward program provider device 110 to generate the reports.

In yet another additional or alternative embodiment, the report may include information associated with changes in the frequency of consumers relative to offers provided as part of the rewards program. For example, the reward program provider device 110 may analyze the information received from the plurality of financial card providers 120 relating to purchases by the participating consumers in view of offers that were communicated to the participating consumers to determine whether the frequency at which consumers visited particular merchants increased as a result of offers relating particular ones of the plurality of merchants 130. For example, the report may indicate that participating consumers visited a particular merchant "X" times during a time period corresponding to when an offer was not provided for the particular merchant, and that the participating consumers visited the particular merchant "Y" times during a time period of equal length corresponding to when an offer was provided for the particular merchant. The information may further indicate a frequency at which targeted offers were provided to participating consumers that were in proximity to participating merchants, and a frequency at which the participating consumers made purchases at the participating merchants after receiving the targeted offers.

The information included in the reports described above may be used by the reward program provider to market the rewards program to non-participating merchants in an attempt to convince them to become a participating merchant. Additionally, the information may be used to refine or change the rewards program. For example, the information described above may indicate that particular merchants are realizing increased purchase frequency while other merchants may realize decreased frequency. The reward program provider may analyze the reward/offer information communicated to consumer in connection with the merchants to determine why some experience increased purchased frequency while the other merchants experience no increase or even a decrease. The reward program provider device 110 may periodically provide one or more of the reports described above to the respective merchants.

In an embodiment, the reward program provider device 110 may determine a commission based on purchases made at a particular merchant by the consumers of the reward program. In an embodiment, the commission may be determined based on purchase information associated with purchases made at the particular merchant by the consumers of the reward program using financial cards provided by the plurality of financial card providers, where the purchase information is received from the plurality of financial card providers, as described above. In an embodiment, the commission may be calculated as a percentage of the total number of dollars spent by the participating consumers at the particular merchant during a time period. In an additional or alternative embodiment, the commission may be based on a total number of purchases made by the participating consumers at the particular merchant during the time period. In yet another additional or alternative embodiment, the commission may be based on both the total number of dollars spent and the number of purchases made by the participating consumers at the particular merchant during the time period. Other forms and terms of calculating the commission may be utilized by the reward program provider device 110, and the examples provided above are provided for purposes of illustration rather than by way of limitation. The reward program provider device 110 may generate an invoice (not shown in FIG. 1) for the particular merchant, where the invoice indicates the commission for the time period, and may provide the invoice to the particular merchant. Further, the reward program provider device 110 may receive a payment 134 of the invoice from the particular merchant.

The earned rewards may be redeemed by the consumer 102 to reduce the price of a product and/or service, as described above. When rewards are redeemed, the reward program provider device 110 may facilitate payment in the amount of the redeemed reward to the particular entity where the reward was redeemed. For example, assume that the consumer 102 redeems $20.00 in earned rewards at the third merchant 160. The reward program provider device 110 may pay the third merchant 160 $20.00. Thus, the participating merchants are not responsible for administering reward redemption. This may reduce the costs to the participating merchants for administering the reward program. Further, as explained above, because all rewards are determined from the notifications received from the financial card providers (e.g., the notifications including the purchase amount, the date, and the token), the participating merchants do not need to build any additional infrastructure to participate in the rewards program. Thus, in the system 100, the plurality of merchants 130 do not have any administration overhead or costs for administering the reward program, and are only responsible for paying a commission to the reward program provider in accordance with any commission terms specified in the contract between the particular merchants and the reward program provider.

A further advantage of the system 100 is that the reward program provider does not retain financial information for the participating consumers, thereby reducing a likelihood that the participating consumers' financial information is compromised or inadvertently shared without the consent of the participating consumers. Additionally, by providing a common currency for all rewards, participating consumers may readily identify the criteria required to earn rewards, milestones that must be met before additional rewards are earned, and whether an amount of earned rewards is enough to be redeemed for a desired product or service, or to pay at least a portion of a particular bill. Thus, the reward program provided by the system 100 of FIG. 1 may improve the technical field of reward programs by increasing the security of consumer financial information, reducing the cost to the merchant for participating in the reward program, and simplifying the reward program to a level that may be easily understood by participating consumer. Further, because the system 100 places the reward program provider device 110 in direct communication with the financial card providers, the system 100 is operable to determine earned rewards in real-time or near-real time, and to provide real-time or near-real time notifications to consumer regarding the rewards.

Figure 2:
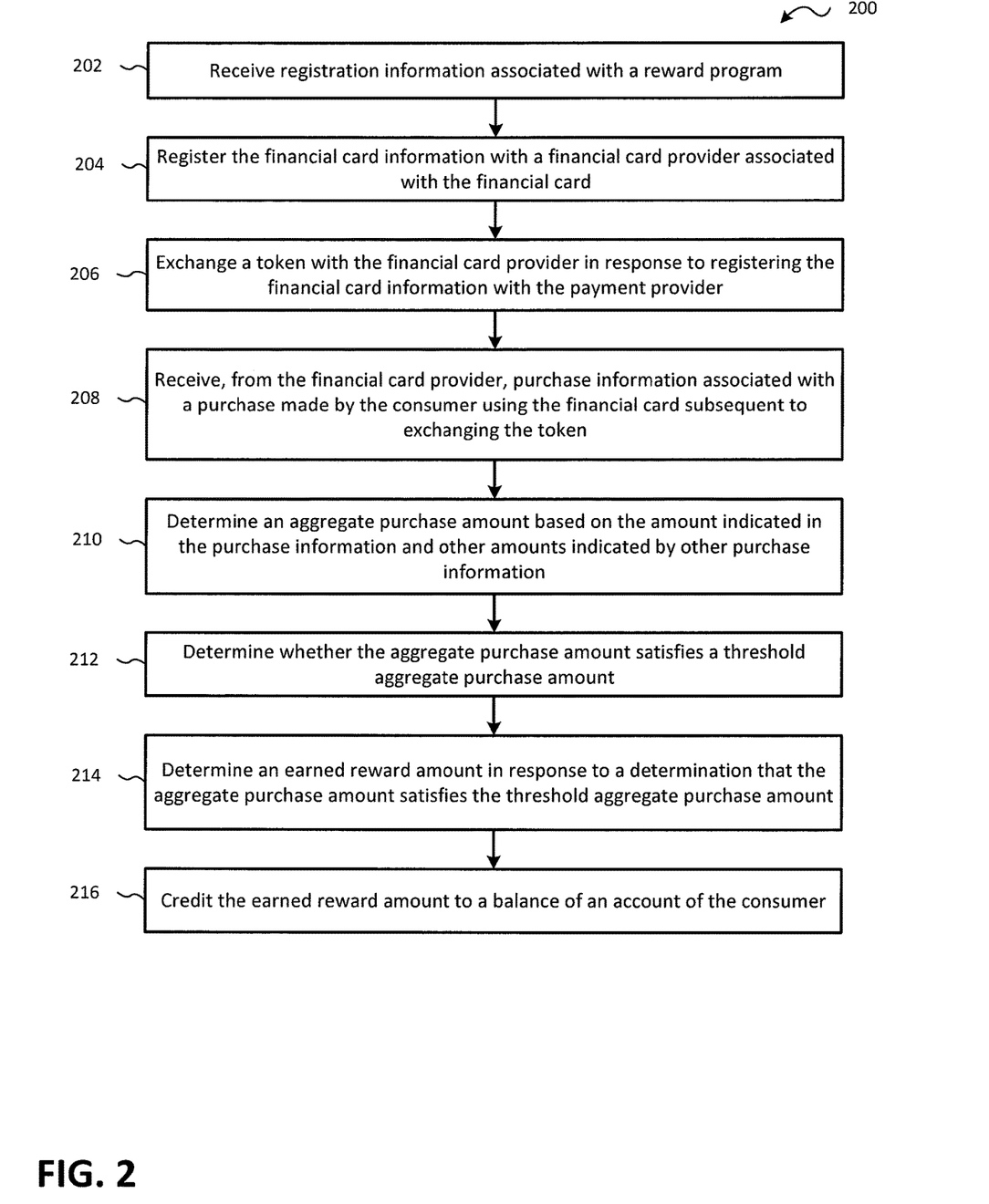
FIG. 2 is a flow chart illustrating an embodiment of a method for discounting a price of commodities to a consumer based on purchases made by the consumer with a plurality of financial cards.

Referring to FIG. 2, a flow chart illustrating an embodiment of a method for discounting a price of commodities to a consumer based on purchases made by the consumer with a plurality of financial cards is shown as a method 200. In an embodiment, the instructions stored at the memory of the reward program provider device 110 may include instructions that are executable by the processor of the reward program provider device 110 to perform the operations of the method 200.

At 202, the method 200 includes receiving registration information associated with a reward program. The registration information may include information identifying a consumer and a financial card information corresponding to a financial card associated with the consumer. In an embodiment, the registration information may be the consumer registration information 104 of FIG. 1, and may include other information, such as permissions information, contact information, etc., as described with reference to FIG. 1. At 204, the method 200 includes registering the financial card information with a financial card provider associated with the financial card. In an embodiment, registering the financial card information with the financial card provider may include transmitting the financial card information to the financial card provider, where the reward program provider has a relationship with the financial card provider, as described with reference to FIG. 1. In an embodiment, registration of the financial card information with the financial card provider may indicate to the financial card provider that the consumer is a participant in the reward program. This may cause the financial card provider to provide purchase information to the reward program provider when the consumer makes purchases at participating merchants using the financial card, as described with reference to FIG. 1. At 206, the method 200 includes exchanging a token with the financial card provider in response to registering the financial card information with the financial card providers. The token may map the consumer to the financial card information, but the token may not include the financial card information. In an embodiment, the token may be used to identify the consumer during exchanges of information between the financial card provider and the reward program provider, rather than using the financial card information. By using the token to identify the consumer and the financial card during exchanges of information between the financial card provider and the reward program provider, a likelihood that an unauthorized third party will be able to intercept or obtain the financial card information may be reduced.

At 208, the method 200 includes receiving, from the financial card provider, purchase information associated with a purchase made by the consumer using the financial card. The purchase information may be received subsequent to receiving the token and may indicate an amount of the purchase and the token associated with the consumer. At 210, the method 200 includes determining an aggregate purchase amount based on the amount indicated in the purchase information and other amounts indicated by other purchase information. The other purchase information may have been received from the financial card provider, or may have been received from other financial card providers for which the consumer has registered financial cards. The other purchase information may be associated with a plurality of other purchases made by the consumer using registered financial cards, where the other purchases were made at one or more participating merchants, as described with reference to FIG. 1. The other purchase information may indicate an amount for each of the other purchases made by the consumer, and the aggregate purchase amount may be the sum of all purchases made by the consumer for which a reward has not yet been earned, as described in more detail below.

At 212, the method 200 includes determining whether the aggregate purchase amount satisfies a threshold aggregate purchase amount. In an embodiment, rewards may be earned each time that a consumer makes purchases having a total that exceeds the threshold aggregate amount, such as earning $0.10 per $50.00 spent. Thus, when the consumer spends a first amount (e.g., $22.00) at a first merchant (e.g., the first merchant 140 of FIG. 1), $22.00 at a first merchant (e.g., the first merchant 140 of FIG. 1), and a second amount (e.g., $30.00) at a second merchant (e.g., the second merchant 150 of FIG. 1), the aggregate purchase amount may be the sum of the first amount and the second amount (e.g., $22.00+$30.00=$52.00), and when the aggregate purchase amount exceeds the threshold aggregate amount the consumer earns a reward. At 214, the method 200 includes in response to a determination that the aggregate purchase amount satisfies the threshold aggregate purchase amount, determining an earned reward amount. Using the example provided above with reference to 212, the consumer would earn $0.10 in rewards for spending $52.00, and would need to spend an additional $ 48.00 to earn a second reward (e.g., an additional $0.10 in rewards) because the extra $2.00 would be counted towards a next earned reward as additional purchases are made by the consumer.

At 216, the method 200 includes crediting the earned reward amount to a balance of an account of the consumer. In an embodiment, the account is associated with a reward program, such as the reward program provided by the reward program provider device 110 of FIG. 1. The account may store earned rewards for the consumer, and may be updated as new rewards are earned and as rewards are redeemed. In an embodiment, rewards may be redeemed to purchase goods and/or services. For example, the rewards may be redeemed to purchase products (e.g., groceries, toys, electronics, etc.), services (e.g., dry cleaning services, car washes, travel, hotel rooms, etc.), to reduce a cost of a commodity (e.g., reduce and an electric bill, reduce a price per unit (PPU) discount on fuel), etc.), or may be used to reduce a cost to pay a bill (e.g., a cell phone bill, cell phone minutes or data, credit card balances, etc.). Thus, unlike some rewards systems that may provide different rewards for different merchants, the rewards programs of embodiments provides for rewards system that provides a common currency that may be redeemed for products, services, payments, etc. Using a common currency to designate earned rewards amounts may reduce consumer confusion, such as may occur in rewards systems that provide a point system, where the points have different conversion rates depending on the desired form of redemption, or where different forms or rewards types (e.g. points and cash equivalents) may be earned, but have different redemption requirements.

A further advantage of the method 200 is that the reward program provider does not retain financial information for the participating consumers, thereby reducing a likelihood that the participating consumers' financial information is compromised or inadvertently shared without the consent of the participating consumers. Additionally, by providing a common currency for all rewards, participating consumers may readily identify the criteria required to earn rewards, milestones that must be met before additional rewards are earned, and whether an amount of earned rewards is enough to be redeemed for a desired product or service, or to pay at least a portion of a particular bill. Thus, the reward program provided by the method 200 of FIG. 2 may improve the technical field of reward programs by increasing the security of consumer financial information, reducing the cost to the merchant for participating in the reward program, and simplifying the reward program to a level that may be easily understood by participating consumer. Further, because the method 200 places the reward program provider device in direct communication with the financial card providers, the method 200 enables the reward program provider to determine earned rewards in real-time or near-real time, and to provide real-time or near-real time notifications to consumer regarding the rewards, as explained above with reference to FIG. 1.

Although the present disclosure and its advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for discounting a price of commodities to a consumer based on purchases made by the consumer with a plurality of financial cards comprising:

receiving, by a reward program provider computing system, registration information associated with a reward program, wherein the registration information includes information identifying the consumer and financial card information corresponding to a financial card associated with the consumer;

registering the financial card information with a financial card provider associated with the financial card, wherein registration of the financial card information with the financial card provider indicates to the financial card provider that the consumer is a participant in the reward program;

in response to registering the financial card information with the financial card provider, providing a token by the reward program provider computing system with the financial card provider, wherein the token maps the consumer to the financial card information, and wherein the token does not include the financial card information;

subsequent to providing the token by the financial card provider, receiving, by the reward program provider computing system from the financial card provider, purchase information associated with a purchase made by the consumer using the financial card, wherein the purchase information indicates an amount of the purchase and includes the token whereby the reward program provider computing system is notified of purchases made using the financial card for determining earned rewards using the token that does not include the financial card information and without the reward program provider computing system storing the financial card information;

determining an aggregate purchase amount based on the amount indicated in the purchase information and other amounts indicated by other purchase information, wherein the other purchase information is associated with a plurality of other purchases made by the consumer using the plurality of financial cards, wherein the plurality of financial cards includes the financial card, wherein the plurality of other purchases were made at a plurality of merchants, and wherein the other amounts correspond to amounts of each of the one or more other purchases made by the consumer; determining whether the aggregate purchase amount satisfies a threshold aggregate purchase amount; in response to a determination that the aggregate purchase amount satisfies the threshold aggregate purchase amount, determining an earned reward amount; and crediting the earned reward amount to a balance of an account of the consumer, wherein the account is associated with the reward program.

2. The method of claim 1, wherein the method includes receiving merchant registration information from each of the plurality of merchants, wherein the merchant registration information includes, for each of the plurality of merchants, information identifying a particular merchant that is participating in the reward program, wherein the plurality of merchants process financial card payments via a plurality of financial card providers, the plurality of financial card providers including financial card providers corresponding to at least the plurality of financial cards.

3. The method of claim 2, wherein the method includes:

determining a frequency at which consumers of the reward program make purchases at each of the plurality of merchants, wherein, for a first merchant of the plurality of merchants, a frequency at which the consumers make purchases at the first merchant is determined based on purchase information associated with purchases made at the first merchant by the consumers of the reward program using financial cards provided by the plurality of financial card providers, and wherein the purchase information is received from the plurality of financial card providers;

generating a plurality of reports, wherein each of the plurality of reports is associated with one of the plurality of merchants, and wherein each of the plurality of reports indicates the frequency at which consumers of the reward program make purchases a respective merchant of the plurality of merchants; and providing the plurality of reports to the respective merchants of the plurality of merchants.

4. The method of claim 2, wherein the method includes:

determining, for a first merchant of the plurality of merchants, a commission based on purchases made at the first merchant by the consumers of the reward program using financial cards provided by the plurality of financial card providers, wherein the commission is determined based on purchase information associated with purchases made at the first merchant by the consumers of the reward program using financial cards provided by the plurality of financial card providers, and wherein the purchase information is received from the plurality of financial card providers;

generating an invoice for the first merchant, wherein the invoice indicates the commission;

providing the invoice to the first merchant; and receiving payment of the invoice from the first merchant.

5. The method of claim 1, wherein the method includes:

determining, based on location data, whether the consumer is proximate at least one merchant that is participating in the reward program;

in response to a determination that the consumer is proximate to the at least one merchant, identifying one or more offers associated with the at least one merchant; and providing the one or more offers associated with the at least one merchant to the consumer.

6. The method of claim 5, wherein the one or more offers include at least one offer selected from a list of offers consisting of: an offer for a discount on a product sold by the at least one merchant, an offer for a discount on a service provided by the at least one merchant, an offer to redeem at least a portion of the balance of the account of the consumer in connection with a purchase of a product, a service, or both from the at least one merchant, an offer for a price per unit (PPU) discount on fuel sold by the at least one merchant, and a notification that one or more offers from the at least one merchant are about to expire.

7. The method of claim 6, wherein the one or more offers are exclusive to consumers participating in the reward program.

8. The method of claim 5, wherein identifying the one or more offers associated with the at least one merchant includes:
  determining one or more rewards redemption programs associated with the consumer, wherein the consumer selects the one or more rewards redemption programs from among a plurality of rewards redemption programs, and wherein the plurality of rewards redemption programs indicate a type of reward to be provided using the balance of the account of the consumer; and
  determining whether a particular rewards redemption program of the one or more rewards redemption programs corresponds to the at least one merchant.

9. The method of claim 5, wherein the one or more offers are provided to the consumer via an e-mail, a text message, a short message service (SMS) message, a multimedia messaging service (MMS) message, a push notification, a prompt provided via a mobile application executing on a mobile device associated with the consumer, or a combination thereof.

10. The method of claim 1, wherein the method includes providing a notification to the consumer that indicates the balance of the account has been credited the earned reward amount.

11. An apparatus for discounting a price of commodities to a consumer based on purchases made by the consumer with a plurality of financial cards comprising:
  at least one processor configured to:
  receive, by a reward program provider computing system, registration information associated with a reward program, wherein the registration information includes information identifying the consumer and financial card information corresponding to a financial card associated with the consumer;
  register the financial card information with a financial card provider associated with the financial card, wherein registration of the financial card information with the financial card provider indicates to the financial card provider that the consumer is a participant in the reward program;
  in response to registering the financial card information with the financial card provider, provide a token by the reward program provider computing system with the financial card provider, wherein the token maps the consumer to the financial card information, and wherein the token does not include the financial card information;
  subsequent to providing the token by the financial card provider, receive, by the reward program provider computing system from the financial card provider, purchase information associated with a purchase made by the consumer using the financial card, wherein the purchase information indicates an amount of the purchase and includes the token whereby the reward program provider computing system is notified of purchases made using the financial card for determining earned rewards using the token that does not include the financial card information and without the reward program provider computing system storing the financial card information;
  determine an aggregate purchase amount based on the amount indicated in the purchase information and other amounts indicated by other purchase information, wherein the other purchase information is associated with a plurality of other purchases made by the consumer using the plurality of financial cards, wherein the plurality of financial cards includes the financial card, wherein the plurality of other purchases were made at a plurality of merchants, and wherein the other amounts correspond to amounts of each of the one or more other purchases made by the consumer;
  determine whether the aggregate purchase amount satisfies a threshold aggregate purchase amount;
  in response to a determination that the aggregate purchase amount satisfies the threshold aggregate purchase amount, determine an earned reward amount; and
  credit the earned reward amount to a balance of an account of the consumer, wherein the account is associated with the reward program; and a memory coupled to the processor.

12. The apparatus of claim 11, wherein the at least one processor is configured to:
  receive merchant registration information from each of the plurality of merchants, wherein the merchant registration information includes, for each of the plurality of merchants, information identifying a particular merchant that is participating in the reward program, wherein the plurality of merchants process financial card payments via a plurality of financial card providers, the plurality of financial card providers including financial card providers corresponding to at least the plurality of financial cards;
  determine a frequency at which consumers of the reward program make purchases at each of the plurality of merchants, wherein, for a first merchant of the plurality of merchants, a frequency at which the consumers make purchases at the first merchant is determined based on purchase information associated with purchases made at the first merchant by the consumers of the reward program using financial cards provided by the plurality of financial card providers, and wherein the purchase information is received from the plurality of financial card providers;
  generate a plurality of reports, wherein each of the plurality of reports is associated with one of the plurality of merchants, and wherein each of the plurality of reports indicates the frequency at which consumers of the reward program make purchases a respective merchant of the plurality of merchants; and
  provide the plurality of reports to the respective merchants of the plurality of merchants.

13. The apparatus of claim 12, wherein the at least one processor is configured to:
  determine, for the first merchant of the plurality of merchants, a commission based on purchases made at the first merchant by the consumers of the reward program using financial cards provided by the plurality of financial card providers, wherein the commission is determined based on purchase information associated with purchases made at the first merchant by the consumers of the reward program using financial cards provided by the plurality of financial card providers, and wherein the purchase information is received from the plurality of financial card providers;
  generate an invoice for the first merchant, wherein the invoice indicates the commission;
  provide the invoice to the first merchant; and
  receive payment of the invoice from the first merchant.

14. The apparatus of claim 11, wherein the at least one processor is configured to:
  determine, based on location data, whether the consumer is proximate at least one merchant that is participating in the reward program;

in response to a determination that the consumer is proximate to the at least one merchant, identify one or more offers associated with the at least one merchant, wherein the one or more offers include at least one offer selected from a list of offers consisting of: an offer for a discount on a product sold by the at least one merchant, an offer for a discount on a service provided by the at least one merchant, an offer to redeem at least a portion of the balance of the account of the consumer in connection with a purchase of a product, a service, or both from the at least one merchant, an offer for a commodity reward, and a notification that one or more offers from the at least one merchant are about to expire; and provide the one or more offers associated with the at least one merchant to the consumer.

15. The apparatus of claim 14, wherein the one or more offers are exclusive to consumers participating in the reward program.

16. The apparatus of claim 14, wherein the one or more offers are provided to the consumer via an e-mail, a text message, a short message service (SMS) message, a multimedia messaging service (MMS) message, a push notification, a prompt provided via a mobile application executing on a mobile device associated with the consumer, or a combination thereof.

17. A non-transitory computer-readable storage medium storing instructions that, when executed by a processor, cause the processor to perform operations for discounting a price of commodities to a consumer based on purchases made by the consumer with a plurality of financial cards, the operations comprising:

receiving, by a reward program provider computing system, registration information associated with a reward program, wherein the registration information includes information identifying the consumer and financial card information corresponding to a financial card associated with the consumer;

registering the financial card information with a financial card provider associated with the financial card, wherein registration of the financial card information with the financial card provider indicates to the financial card provider that the consumer is a participant in the reward program;

in response to registering the financial card information with the financial card provider, providing a token by the reward program provider computing system with the financial card provider, wherein the token maps the consumer to the financial card information, and wherein the token does not include the financial card information;

subsequent to providing the token by the financial card provider, receiving, by the reward program provider computing system from the financial card provider, purchase information associated with a purchase made by the consumer using the financial card, wherein the purchase information indicates an amount of the purchase and includes the token whereby the reward program provider computing system is notified of purchases made using the financial card for determining earned rewards using the token that does not include the financial card information and without the reward program provider computing system storing the financial card information;

determining an aggregate purchase amount based on the amount indicated in the purchase information and other amounts indicated by other purchase information, wherein the other purchase information is associated with a plurality of other purchases made by the consumer using the plurality of financial cards, wherein the plurality of financial cards includes the financial card, wherein the plurality of other purchases were made at a plurality of merchants, and wherein the other amounts correspond to amounts of each of the one or more other purchases made by the consumer;

determining whether the aggregate purchase amount satisfies a threshold aggregate purchase amount;

in response to a determination that the aggregate purchase amount satisfies the threshold aggregate purchase amount, determining an earned reward amount; and crediting the earned reward amount to a balance of an account of the consumer, wherein the account is associated with the reward program.

18. The computer-readable storage medium of claim 17, wherein the operations include:

receiving merchant registration information from each of the plurality of merchants, wherein the merchant registration information includes, for each of the plurality of merchants, information identifying a particular merchant that is participating in the reward program, wherein the plurality of merchants process financial card payments via a plurality of financial card providers, the plurality of financial card providers including financial card providers corresponding to at least the plurality of financial cards;

determining a frequency at which consumers of the reward program make purchases at each of the plurality of merchants, wherein, for a first merchant of the plurality of merchants, a frequency at which the consumers make purchases at the first merchant is determined based on purchase information associated with purchases made at the first merchant by the consumers of the reward program using financial cards provided by the plurality of financial card providers, and wherein the purchase information is received from the plurality of financial card providers;

generating a plurality of reports, wherein each of the plurality of reports is associated with one of the plurality of merchants, and wherein each of the plurality of reports indicates the frequency at which consumers of the reward program make purchases a respective merchant of the plurality of merchants; and provide the plurality of reports to the respective merchants of the plurality of merchants.

19. The computer-readable storage medium of claim 18, wherein the operations include:

determining, for the first merchant of the plurality of merchants, a commission based on purchases made at the first merchant by the consumers of the reward program using financial cards provided by the plurality of financial card providers, wherein the commission is determined based on purchase information associated with purchases made at the first merchant by the consumers of the reward program using financial cards provided by the plurality of financial card providers, and wherein the purchase information is received from the plurality of financial card providers;

generating an invoice for the first merchant, wherein the invoice indicates the commission;

providing the invoice to the first merchant; and receiving payment of the invoice from the first merchant.

20. The computer-readable storage medium of claim 17, wherein the operations include:

determining, based on location data, whether the consumer is proximate at least one merchant that is participating in the reward program;

in response to a determination that the consumer is proximate to the at least one merchant, identifying one or more offers associated with the at least one merchant, wherein the one or more offers include at least one offer selected from a list of offers consisting of: an offer for a discount on a product sold by the at least one merchant, an offer for a discount on a service provided by the at least one merchant, an offer to redeem at least a portion of the balance of the account of the consumer in connection with a purchase of a product, a service, or both from the at least one merchant, an offer for a commodity reward, and a notification that one or more offers from the at least one merchant are about to expire, and wherein the one or more offers are exclusive to consumers participating in the reward program; and providing the one or more offers associated with the at least one merchant to the consumer, wherein the one or more offers are provided to the consumer via an e-mail, a text message, a short message service (SMS) message, a multimedia messaging service (MMS) message, a push notification, a prompt provided via a mobile application executing on a mobile device associated with the consumer, or a combination thereof.

21. A method for discounting a price of commodities to a consumer based on purchases made by the consumer with a plurality of financial cards comprising:

receiving, by a reward program provider computing system, registration information associated with a reward program, wherein the registration information includes information identifying the consumer, first financial card information corresponding to a first financial card of the plurality of financial cards associated with the consumer, and second financial card information corresponding to a second financial card of the plurality of financial cards associated with the consumer;

registering the first financial card information with a first financial card provider associated with the first financial card, wherein registration of the first financial card information with the first financial card provider indicates to the first financial card provider that the consumer is a participant in the reward program;

in response to registering the first financial card information with the first financial card provider, providing a first token by the reward program provider computing system with the first financial card provider, wherein the first token maps the consumer to the first financial card information, and wherein the first token does not include the first financial card information;

registering the second financial card information with a second financial card provider associated with the second financial card, wherein registration of the second financial card information with the second financial card provider indicates to the second financial card provider that the consumer is a participant in the reward program;

in response to registering the second financial card information with the second financial card provider, providing a second token by the reward program provider computing system with the second financial card provider, wherein the second token maps the consumer to the second financial card information, and wherein the second token does not include the second financial card information;

subsequent to providing the first token by the first financial card provider, receiving, by the reward program provider computing system from the first financial card provider, purchase information associated with a purchase made by the consumer using the first financial card, wherein the purchase information associated with the purchase made by the consumer using the first financial card indicates an amount of the purchase and includes the first token whereby the reward program provider computing system is notified of purchases made using the first financial card for determining earned rewards without the reward program provider computing system storing the first financial card information;

determining an aggregate purchase amount based on the amount indicated in the purchase information associated with the purchase made by the consumer using the first financial card and other amounts indicated by other purchase information, wherein the other purchase information is associated with a plurality of other purchases made by the consumer using the plurality of financial cards including purchase information associated with one or more purchases made by the consumer using the second financial card, wherein the plurality of financial cards includes the first financial card and the second financial card, wherein the plurality of other purchases were made at a plurality of merchants, and wherein the other amounts correspond to amounts of each of the one or more other purchases made by the consumer;

determining whether the aggregate purchase amount satisfies a threshold aggregate purchase amount;

in response to a determination that the aggregate purchase amount satisfies the threshold aggregate purchase amount, determining an earned reward amount; and crediting the earned reward amount to a balance of an account of the consumer, wherein the account is associated with the reward program.

22. The method of claim 21, wherein the first token is associated with the first financial card and the second token is associated with the second financial card.

23. The method of claim 21, wherein the first token and the second token are generated by the reward program provider computing system.

24. The method of claim 21, wherein the first token is generated by the first financial card provider and the second token is generated by the second financial card provider.

25. The method of claim 21, wherein the first token and the second token are generated in response to a successful validation of one or more of the first financial card and the second financial card.

* * * * *